(12) United States Patent
Volk et al.

(10) Patent No.: US 8,683,821 B2
(45) Date of Patent: Apr. 1, 2014

(54) SEDIMENT TRAP SYSTEM AND METHOD

(75) Inventors: James J. Volk, Fort Wayne, IN (US); Ryan A. Johnson, Oklahoma City, OK (US)

(73) Assignee: Franklin Electric Company, Inc., Fort Wayne, IN (US)

( * ) Notice: Subject to any disclaimer, the term of this patent is extended or adjusted under 35 U.S.C. 154(b) by 392 days.

(21) Appl. No.: 13/087,737

(22) Filed: Apr. 15, 2011

(65) Prior Publication Data

US 2011/0271704 A1 Nov. 10, 2011

Related U.S. Application Data

(60) Provisional application No. 61/324,554, filed on Apr. 15, 2010.

(51) Int. Cl.
*F25D 21/14* (2006.01)

(52) U.S. Cl.
USPC ............................................ 62/291; 62/324.6

(58) Field of Classification Search
USPC ........ 62/291, 285, 272, 279, 125, 324.6, 126, 62/157; 137/386, 397; 29/428, 890.146
See application file for complete search history.

(56) References Cited

U.S. PATENT DOCUMENTS

| | | | |
|---|---|---|---|
| 1,954,304 A | 4/1934 | Weems |
| 2,048,246 A | 7/1936 | Dasher |
| 2,062,042 A | 11/1936 | Sargent |
| 2,132,372 A | 10/1938 | Locke |
| 2,179,632 A | 11/1939 | Hulse |
| 2,213,347 A | 9/1940 | Neeson |
| 2,243,478 A | 5/1941 | Knoy |
| 2,251,960 A | 8/1941 | Smith |
| 2,260,312 A | 10/1941 | Graman |
| 2,268,186 A | 12/1941 | Candor |
| 2,669,934 A | 2/1954 | Lovett |
| 2,728,206 A | 12/1955 | Drake |
| 2,737,787 A | 3/1956 | Kritzer |
| 2,829,598 A | 4/1958 | Zimmermann |
| 2,887,854 A | 5/1959 | Soder |
| 2,981,196 A | 4/1961 | Zimmermann |
| 3,065,712 A | 11/1962 | Buchanan |
| 3,127,927 A | 4/1964 | Zinman |
| 3,363,674 A | 1/1968 | Miner |
| 3,394,560 A | 7/1968 | Glickman |
| 3,635,046 A | 1/1972 | Sato et al. |

(Continued)

FOREIGN PATENT DOCUMENTS

| | | |
|---|---|---|
| CN | 2505760 | 8/2002 |
| DE | 2514152 | 10/1976 |

(Continued)

OTHER PUBLICATIONS

Little Giant Pump Company, Little Giant Electronic Condensate Unit installation brochure, Apr. 2009, 12 pgs.

(Continued)

*Primary Examiner* — Mohammad M Ali
(74) *Attorney, Agent, or Firm* — Faegre Baker Daniels LLP

(57) ABSTRACT

Systems and methods for condensate removal are disclosed. A reservoir may include a trap structure and a sediment trap may be disposed within the trap structure. The sediment trap may be positioned within the reservoir so that condensate flowing into the reservoir is filtered before flowing out of the reservoir.

16 Claims, 14 Drawing Sheets

(56) References Cited

U.S. PATENT DOCUMENTS

| | | | |
|---|---|---|---|
| 3,758,236 A | 9/1973 | Zimmerman | |
| 3,763,901 A * | 10/1973 | Viland | 141/8 |
| 3,766,751 A | 10/1973 | Ball | |
| 4,045,338 A | 8/1977 | Miyamoto | |
| 4,120,158 A * | 10/1978 | Sheinbaum | 60/641.3 |
| 4,275,995 A | 6/1981 | Taylor | |
| 4,382,369 A | 5/1983 | Stocking | |
| 4,566,287 A | 1/1986 | Schmidt | |
| 4,748,821 A | 6/1988 | Berenter | |
| 4,896,052 A | 1/1990 | Morrison | |
| 4,937,559 A | 6/1990 | Meacham | |
| 5,056,588 A | 10/1991 | Carr | |
| 5,074,119 A | 12/1991 | Anderson | |
| 5,203,989 A | 4/1993 | Reidy | |
| 5,212,958 A | 5/1993 | Anderson | |
| 5,271,237 A | 12/1993 | Popelka | |
| 5,293,894 A | 3/1994 | Fleischmann | |
| 5,323,620 A | 6/1994 | Wood | |
| 5,341,653 A | 8/1994 | Tippmann | |
| 5,511,386 A | 4/1996 | Russ | |
| 5,553,459 A | 9/1996 | Harrison | |
| 5,570,680 A | 11/1996 | Payne | |
| 5,651,259 A | 7/1997 | Twyman | |
| 5,669,221 A | 9/1997 | LeBleu | |
| 5,832,739 A | 11/1998 | Bacchus | |
| 5,848,536 A | 12/1998 | Dodge | |
| 5,922,094 A * | 7/1999 | Richards | 55/355 |
| 6,041,611 A | 3/2000 | Palmer | |
| 6,044,656 A | 4/2000 | Shirota | |
| 6,053,418 A * | 4/2000 | Guyer | 237/12.1 |
| 6,058,718 A | 5/2000 | Forsberg | |
| 6,167,714 B1 | 1/2001 | Baffes | |
| 6,203,281 B1 | 3/2001 | Gurega | |
| 6,247,324 B1 | 6/2001 | Hsu | |
| 6,321,554 B1 | 11/2001 | Rigoni | |
| 6,322,326 B1 | 11/2001 | Davis | |
| 6,336,338 B1 | 1/2002 | Koren | |
| 6,360,548 B1 | 3/2002 | Navarro | |
| 6,370,902 B1 | 4/2002 | De'Longhi | |
| 6,389,834 B1 | 5/2002 | LeClear | |
| 6,467,698 B2 | 10/2002 | Gaarder | |
| 6,587,642 B1 | 7/2003 | King | |
| 6,592,333 B1 | 7/2003 | Magallanes | |
| 6,718,786 B1 | 4/2004 | Hille | |
| 6,817,194 B1 | 11/2004 | Leach | |
| 6,880,354 B2 | 4/2005 | Reimann | |
| 6,926,502 B2 | 8/2005 | Lin | |
| 6,976,367 B2 | 12/2005 | Spanger | |
| 6,983,621 B2 | 1/2006 | Cur | |
| 7,032,406 B2 | 4/2006 | Hollen | |
| 7,055,262 B2 | 6/2006 | Goldberg | |
| 7,062,936 B2 | 6/2006 | Rand | |
| 7,252,482 B2 | 8/2007 | Walker | |
| 7,520,736 B2 | 4/2009 | Pohler | |
| 2002/0046569 A1 | 4/2002 | Faqih | |
| 2003/0205055 A1 | 11/2003 | Shahbaz | |
| 2005/0138939 A1 | 6/2005 | Spanger | |
| 2007/0028640 A1 | 2/2007 | Hampton | |
| 2009/0071181 A1 | 3/2009 | Spanger | |
| 2010/0037644 A1 | 2/2010 | Ward | |

FOREIGN PATENT DOCUMENTS

| | | |
|---|---|---|
| DE | 4110081 | 10/1992 |
| DE | 60207033 | 8/2006 |
| DE | 60225191 | 2/2009 |
| EP | 0268776 | 6/1988 |
| EP | 0507267 | 10/1992 |
| EP | 0552913 | 7/1993 |
| EP | 1318361 | 6/2003 |
| EP | 1510765 | 3/2005 |
| EP | 2138779 | 12/2009 |
| EP | 2189312 | 5/2010 |
| FR | 2806785 | 9/2001 |
| FR | 2941037 | 7/2010 |
| GB | 280779 | 11/1927 |
| GB | 434281 | 8/1935 |
| GB | 844876 | 8/1960 |
| GB | 844877 | 8/1960 |
| GB | 2255163 | 10/1992 |
| GB | 2382843 | 6/2003 |
| JP | 59052140 | 3/1984 |
| JP | 62129628 | 6/1987 |
| JP | 63101646 | 5/1988 |
| JP | 2176329 | 7/1990 |
| JP | 4036519 | 2/1992 |
| JP | 5001829 | 1/1993 |
| JP | 6221594 | 8/1994 |
| JP | 6229662 | 8/1994 |
| JP | 6257779 | 9/1994 |
| JP | 6017324 | 8/1995 |
| JP | 8061687 | 3/1996 |
| JP | 63302230 | 3/1996 |
| JP | 8200726 | 8/1996 |
| JP | 2610673 | 5/1997 |
| JP | 9112959 | 5/1997 |
| JP | 9152174 | 6/1997 |
| JP | 9203536 | 8/1997 |
| JP | 9216529 | 8/1997 |
| JP | 9296938 | 11/1997 |
| JP | 10009649 | 1/1998 |
| JP | 10019294 | 1/1998 |
| JP | 10141691 | 5/1998 |
| JP | 10170016 | 6/1998 |
| JP | 10288384 | 10/1998 |
| JP | 11108390 | 4/1999 |
| JP | 11132503 | 5/1999 |
| JP | 11182420 | 7/1999 |
| JP | 11337110 | 12/1999 |
| JP | 2000046362 | 2/2000 |
| JP | 2000266278 | 9/2000 |
| JP | 2001059630 | 3/2001 |
| JP | 2000028158 | 7/2001 |
| JP | 2001201085 | 7/2001 |
| JP | 3231574 | 11/2001 |
| JP | 3532718 | 5/2004 |
| JP | 3543063 | 7/2004 |
| JP | 2005127677 | 5/2005 |
| KR | 20020044798 | 6/2002 |
| KR | 20020044801 | 6/2002 |
| KR | 20030037554 | 5/2003 |
| KR | 20030037555 | 5/2003 |
| KR | 100857600 | 9/2008 |
| WO | WO 97/17584 | 5/1997 |
| WO | WO 99/06773 | 2/1999 |
| WO | WO 2006/105017 | 10/2006 |
| WO | WO 2007/016666 | 2/2007 |
| WO | WO 2009/078996 | 6/2009 |
| WO | WO 2010/019747 | 2/2010 |

OTHER PUBLICATIONS

Aspen Pumps Mini and Maxi Lime Mini Pump, www.aspenpumps.com/en/mini-a-maxi-lime.html, Sep. 2010, 3 pgs.
Aspen Pumps mini & maxi lime pump brochure, Apr. 2009, 9 pgs.
Aspen Pumps, Mini Orange Pump webpage, Jul. 2011, 2 pgs.
Aspen Pumps, Maxi Lime Technical Specification, 1 pg.
Eckerle Industri-Elektronik GmbH, Condensate pumps brochure, 4 pgs.
Eckerle Industri-Elektronik GmbH, Condensate water pump EE 1200 : instruction manual, Aug. 2006, 36 pgs.
Sauermann, Sauermann Piston Pump Delta Pack, Jul. 2009, 2 pgs.
Sauermann, Sauermann UK Delta Pack Tech Data Sheet, Sep. 2009, 2 pgs.
INOAC Corp., Air Conditioning Materials Brochure from Aircovent, 5 pgs.
Castel Airco Airco ducts accessories brochure, 2 pgs.
Gotec SA, Condensate water pump RAPIDO, instruction manual for assembly on the right, Jan. 2009, 32 pgs.
Siccom, FLOWWATCH® Design technical data sheet, 2 pgs.

(56) References Cited

OTHER PUBLICATIONS

Electrical Safety Council, Bending RadII Technical Manual B29-1, 4 pgs.

International Search Report of the International Search Authority in PCT/US2011/032687, Aug. 2, 2011, 7 pgs.

International Search Report and Written Opinion of the International Search Authority in PCT/US2011/032687, Nov. 24, 2011, 17 pgs.

* cited by examiner

SEDIMENT TRAP SYSTEM AND METHOD

RELATED APPLICATIONS

This application claims the benefit of U.S. Provisional Patent Application Ser. No. 61/324,554, filed Apr. 15, 2010, titled SEDIMENT TRAP SYSTEM AND METHOD, the disclosure of which is expressly incorporated herein by reference.

FIELD

The present disclosure relates to an air handling system. More particularly, the present disclosure relates to a condensation collection, removal, and sediment trap apparatus for condensate removal.

BACKGROUND

An air conditioning or air handling system may include a coolant flowing between heat exchangers. A heat exchanger inside a structure may receive, for example, coolant in a liquid form. The coolant flowing through the heat exchanger in the structure may warm and turn into a gas after flowing through the heat exchanger inside the structure, and a fan may move air over the cooled heat exchanger in the structure, cooling the air. Moisture in the warm air in the structure may condense on the cooled heat exchanger, and the air conditioning system may collect the condensate. Condensate may collect in a reservoir and may be removed from the reservoir with, for example, a pump. For at least these reasons, systems and methods which remove condensate are important for an air handling system or air conditioning system.

SUMMARY

In an exemplary embodiment of the present disclosure, an air handling system is provided. The air handling system including a condensate reservoir and a sediment trap removably coupled to the condensate reservoir.

In another exemplary embodiment of the present disclosure, an apparatus for handling a condensate fluid is provided. The apparatus comprising a reservoir having a basin which receives the condensate fluid and at least a first port through which the condensate fluid is evacuated; a sediment trap including a screen, the sediment trap being removably coupled to the reservoir, the screen extending into the basin when the sediment trap is coupled to the reservoir; a pump housing including a fluid pump; a fluid conduit in fluid communication with the condensate fluid in the reservoir through the first port of the reservoir and in fluid communication with the fluid pump; at least one sensor which provides an indication of a height of the condensate fluid in the reservoir; and a controller which activates the fluid pump based on the height of the condensate fluid in the reservoir.

In a further exemplary embodiment of the present disclosure, an air handling system is provided. The air handling system being positioned within a structure. The air handling system comprising a fan and heat exchanger unit; a reservoir including a basin positioned to receive a condensate fluid from the fan and heat exchanger unit; a sediment trap being removably coupled to the reservoir, the sediment trap capturing debris within the condensate fluid; a fluid pump in fluid communication with the reservoir to remove the condensate fluid from the reservoir; and a fluid conduit for communicating the fluid removed from the reservoir towards a location outside of the structure.

In yet another exemplary embodiment, a method of removing debris from a condensate fluid is provided. The method comprising the steps of receiving in a reservoir the condensate fluid from a heat exchanger unit; removably coupling a sediment trap to the reservoir; receiving the condensate fluid and the debris within the sediment trap; allowing the condensate fluid to exit the sediment trap while restricting the exit of the debris from the sediment trap; and uncoupling the sediment trap from the reservoir to remove the debris from the sediment trap.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein.

Figure 1A:
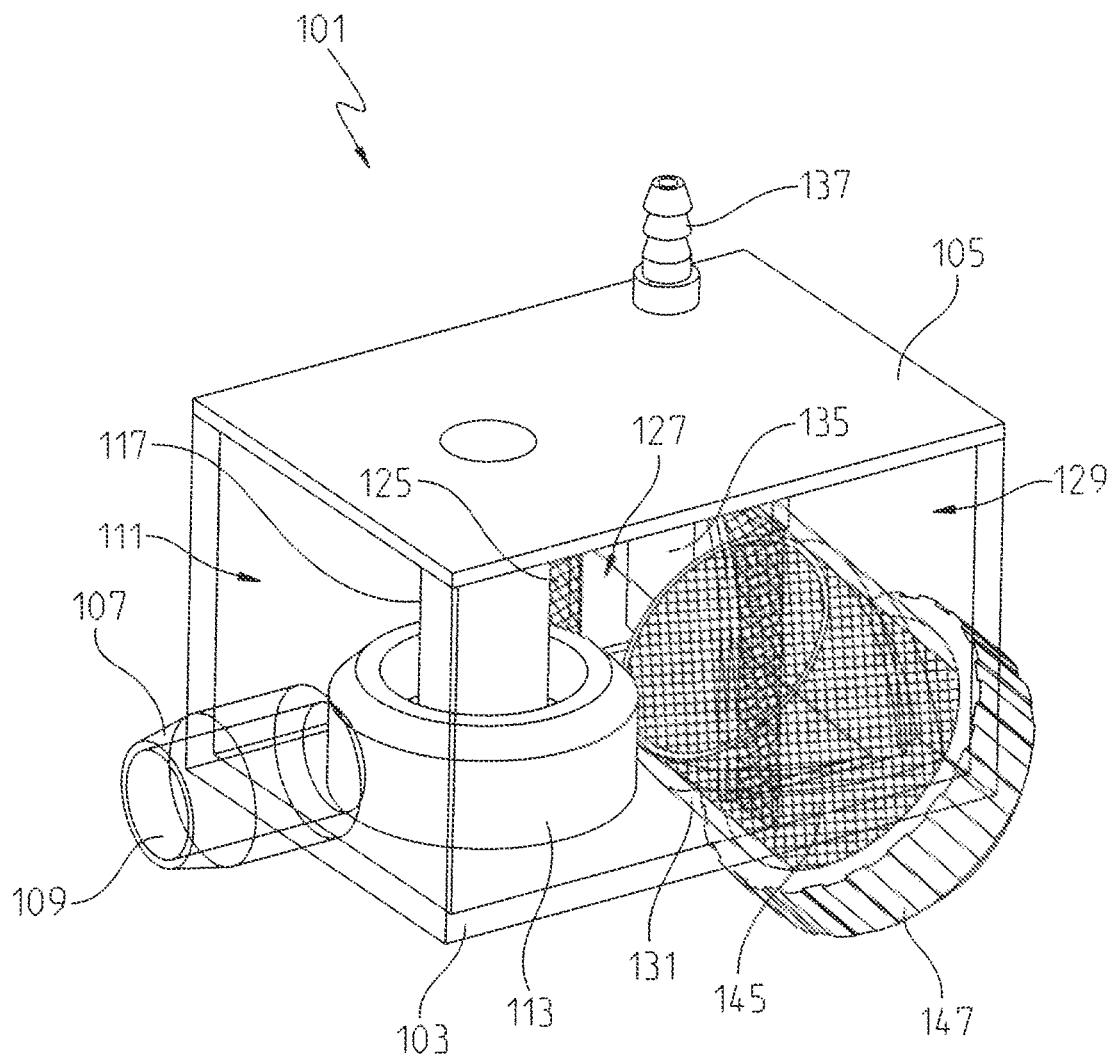
FIG. 1A is a side perspective view of an exemplary reservoir of an exemplary air handing system of the present disclosure.
Figure 1B:
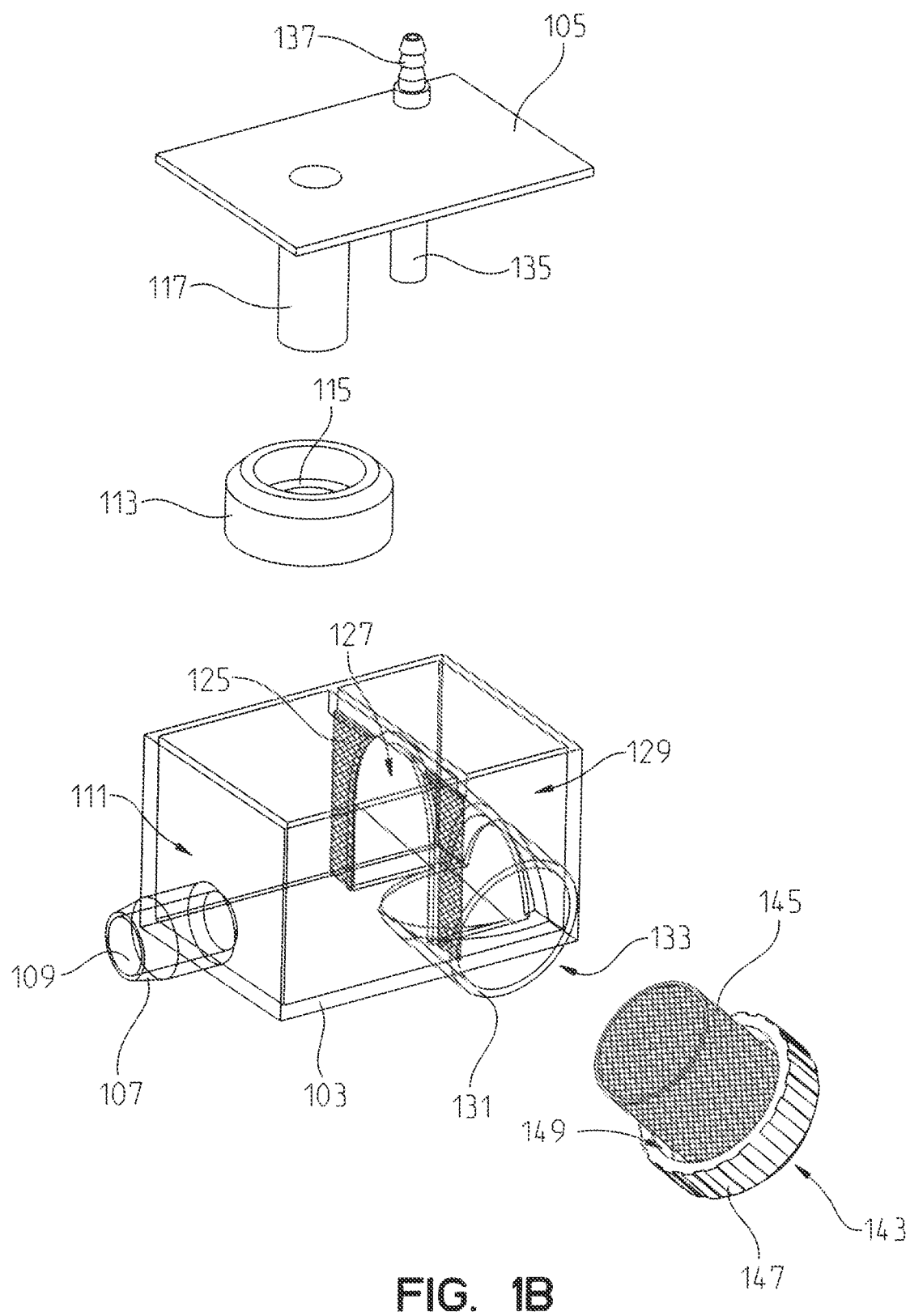
FIG. 1B is an exploded view of the exemplary reservoir of FIG. 1A.

Corresponding reference characters indicate corresponding parts throughout the several views. Unless otherwise stated, the drawings are proportional. The exemplifications set out herein illustrate exemplary embodiments of the disclosure and such exemplifications are not to be construed as limiting the scope of the disclosure in any manner.

DETAILED DESCRIPTION OF THE DRAWINGS

The embodiments of the disclosure described herein are not intended to be exhaustive or to limit the disclosure to the precise forms disclosed. Rather, the embodiments selected for description have been chosen to enable one skilled in the art to practice the subject matter of the disclosure. Although the disclosure describes specific configurations of an air handling system, it should be understood that the concepts presented herein may be used in other various configurations consistent with this disclosure.

Figure 8:
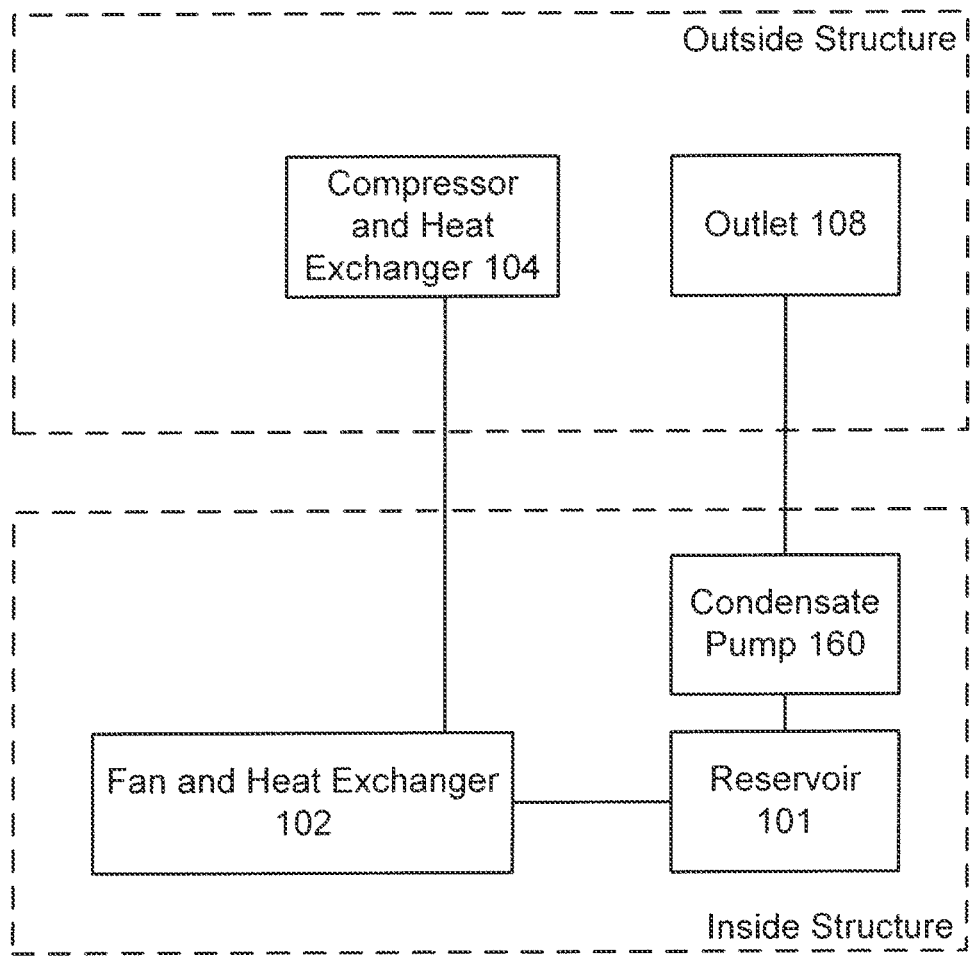
FIG. 8 is a component view of an exemplary air handling system of the present disclosure.

FIG. 8 is a component view of an exemplary air handling system of the present disclosure. FIG. 8 shows a fan and heat exchanger 102 in communication with a compressor and heat exchanger 104. The fan and heat exchanger 102 is also in communication with a reservoir 101. The reservoir 101 is in communication with a condensate pump 160, and the condensate pump 160 is in communication with an outlet 108. The compressor and heat exchanger 104 may receive warm coolant, possibly in a gas form, from the fan and heat exchanger 102. The compressor and heat exchanger 104 compresses the coolant gas into a liquid or otherwise removes heat from the coolant. The compressed coolant is transferred to the fan and heat exchanger 102 within the structure. The fan may direct air within the structure across the heat exchanger or pull air across the heat exchanger, such that the coolant takes on heat from the air resulting in the air being cooled. The now warmed coolant travels back in a substantially closed loop to the compressor and heat exchanger 104 to be cooled.

The cooling of the air inside the structure condenses moisture from the air onto the heat exchanger in the form of a liquid or a solid. The condensate may be removed from the fan and heat exchanger 102 and may be transferred to the reservoir 101. The condensate may be transferred to the reservoir 101 by, for example and without limitation, gravity or a pump. The condensate may flow through a flexible or a rigid tube or trough, or the reservoir 101 may be positioned below the fan and heat exchanger 102 to catch falling material.

The reservoir 101 may collect the condensate condensed from the ambient air by the fan and heat exchanger 102. The reservoir 101 may include one or more sensors to detect the level of condensate within the reservoir 101, and the information regarding the level of condensate may be transmitted to a controller 171 (shown, for example, in FIG. 7), which may take an action based on the level of condensate in the reservoir 101. For example, if the sensors in the reservoir 101 indicate that the level of the condensate has reached a predetermined point, the controller 171 may energize the condensate pump 160 to remove some or all of the condensate from the reservoir 101. The reservoir 101 and the operation of the reservoir 101 and the condensate pump 160 is described in more detail below.

The condensate pump 160 may operate to remove condensate from the reservoir 101. The condensate may flow from the reservoir 101 to the condensate pump 160 through a flexible or a rigid tube or trough. In an embodiment, the condensate pump 160 may be an electric pump with an input and an output. The input may be connected to the reservoir 101, so that condensate may flow from the reservoir 101 to the condensate pump 160. The condensate may flow through the condensate pump 160 to the output of the condensate pump 160, and may flow to the outlet 108 of the air handling system via a flexible or a rigid tube or trough. In an embodiment, the condensate pump 160 may not be included, and the condensate may be removed, for example, as it evaporates from the reservoir 101. In another embodiment, the condensate pump 160 may not be included, and the condensate may flow from the reservoir 101 to the outlet 108 using another process. For example, and without limitation, the condensate may flow from the reservoir 101 to the outlet 108 by gravity. The condensate pump 160 and the operation of the reservoir 101 and the condensate pump 160 is described in more detail below.

The outlet 108 may be positioned inside or outside of the structure. The outlet 108 may be a drain or other structure that disposes of the condensate. In an embodiment, the outlet 108 may be a reservoir, to collect and retain the condensate liquid. For example, the reservoir 101 may collect the condensate liquid so that the condensate liquid may be recycled and used for other purposes.

The fan and heat exchanger 102, the reservoir 101, and the condensate pump 160 may be inside of a structure. The structure may, for example and without limitation, be a building. The compressor and heat exchanger 104, and the outlet 108, may be outside of the structure. In embodiments, some or all of the components may be inside the structure, and in other embodiments, some or all of the components may be outside the structure. If the components are positioned outside of the structure, then the fan and heat exchanger 102 may be positioned, for example, to remove warm air from inside the structure and to move cooled air inside the structure by one or more vents or tubes between the fan and heat exchanger 102 and the inside of the structure.

The temperature of the ambient air inside the structure and outside the structure, and the noise requirements for components inside the structure or outside the structure, may influence the positioning of the components. For example, the compressor may generate noise, and in an effort to reduce the noise inside the structure, the compressor may be positioned outside of the structure. Generally, to cool the ambient air inside a structure, the heat exchanger 102 may be positioned inside the structure, and the heat exchanger 104 may be positioned outside of the structure. Some or all of the components may also be positioned in the same structure. For example, and without limitation, the components 102, 101, 160, 108, and 104 may be positioned within a window or wall mounted structure.

Figure 2:
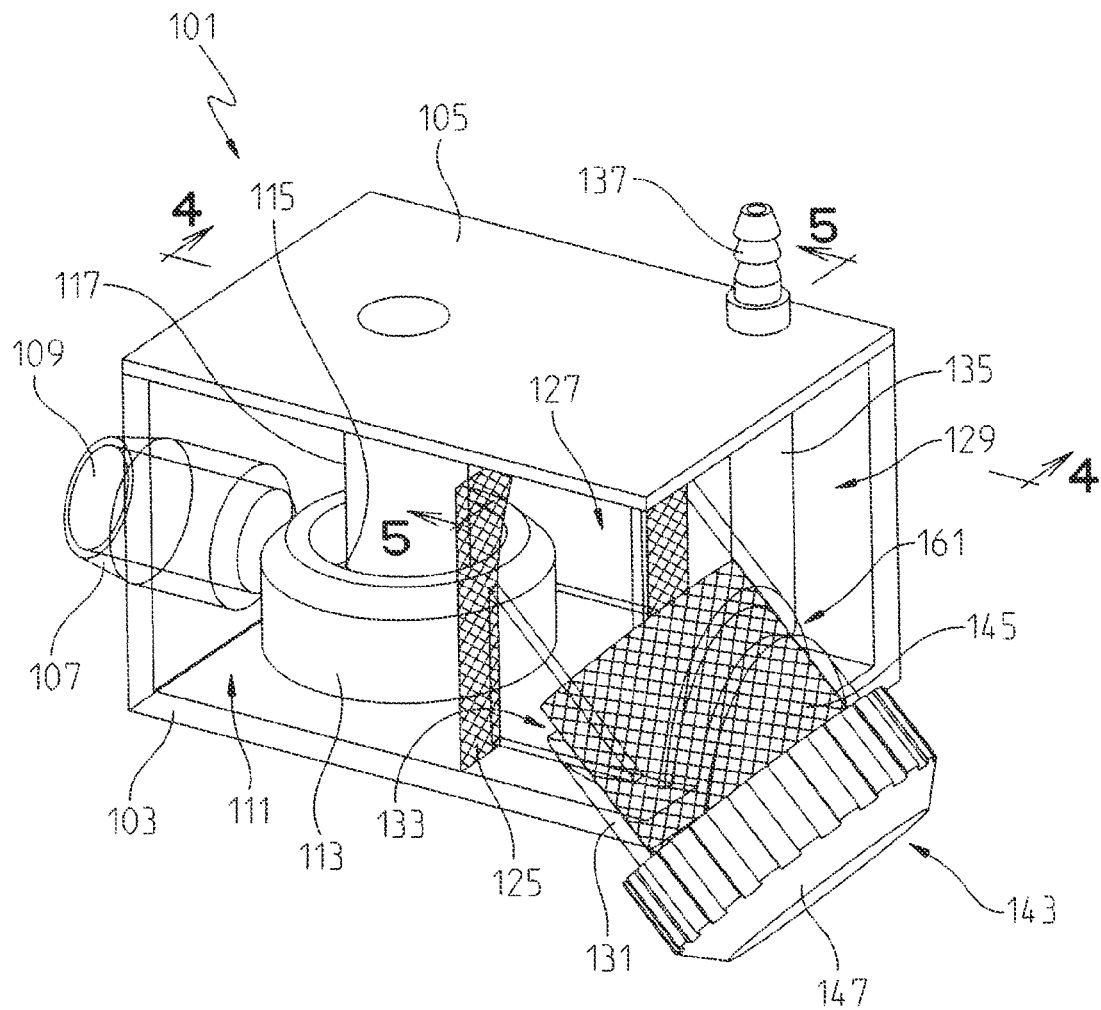
FIG. 2 is a rear perspective view of the exemplary reservoir of FIG. 1A.
Figure 3:
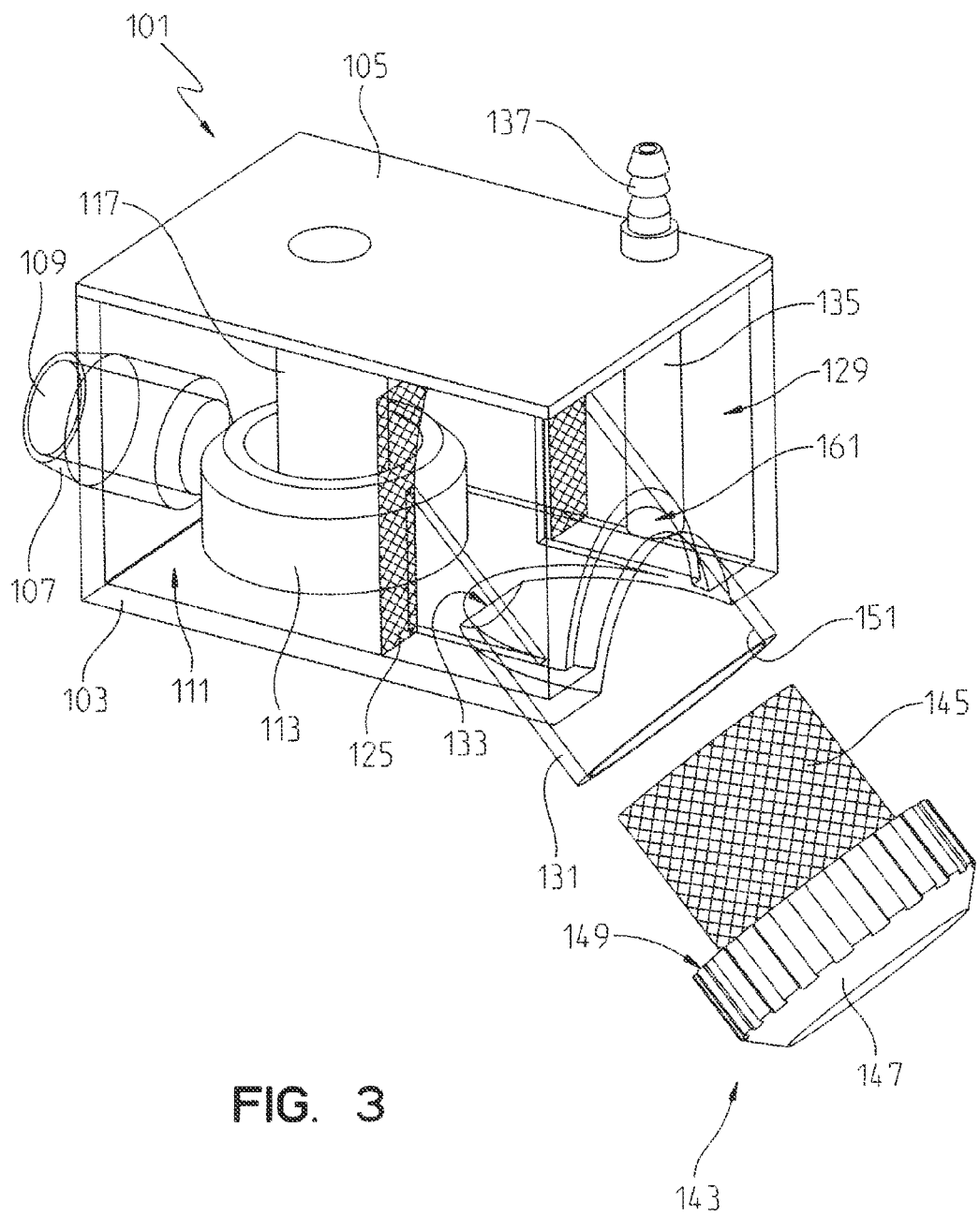
FIG. 3 is a rear perspective view of the exemplary reservoir of FIG. 2, showing the sediment trap removed from the reservoir.
Figure 4:
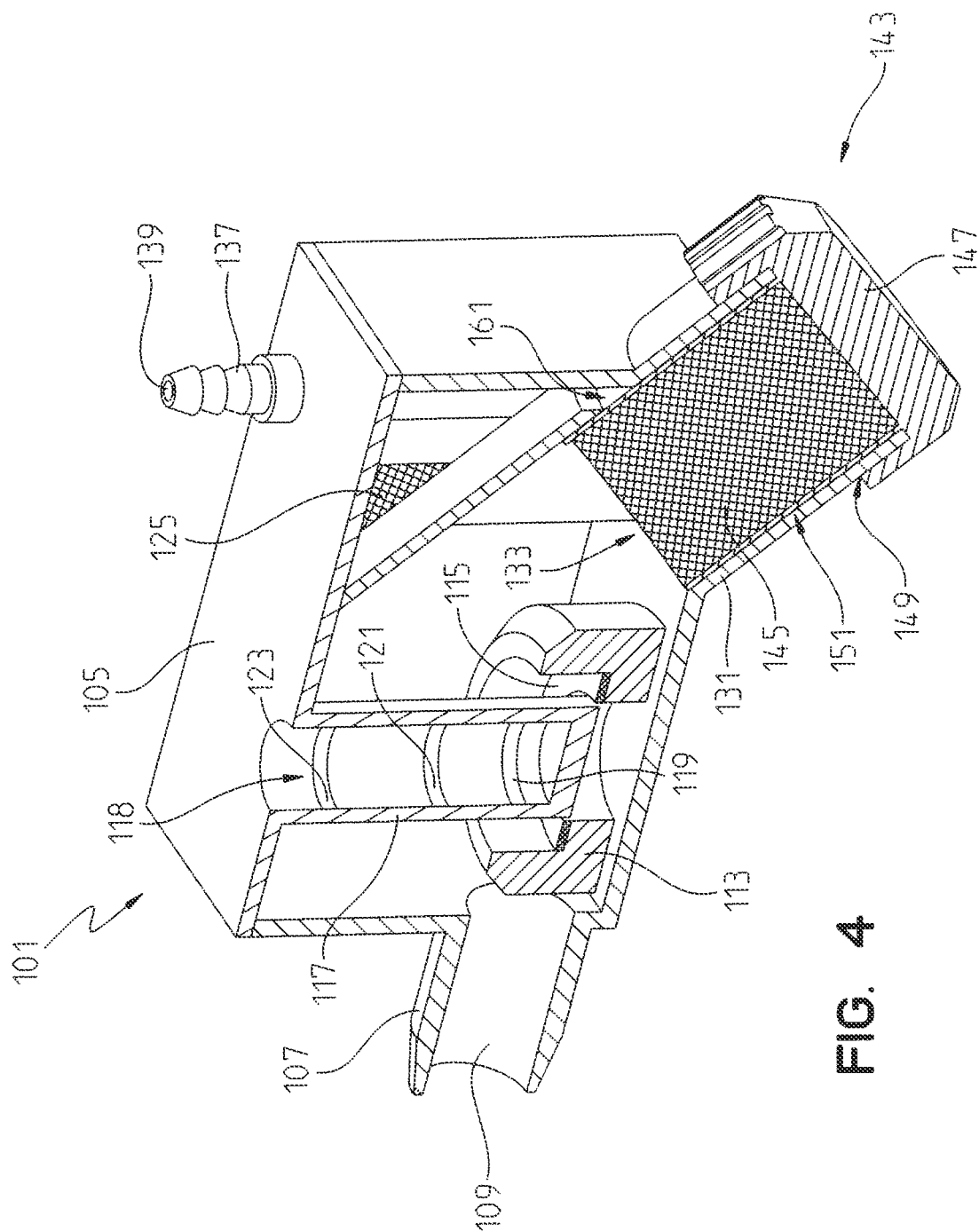
FIG. 4 is a view of the exemplary reservoir of FIG. 2 along line 4 in FIG. 2.
Figure 5:
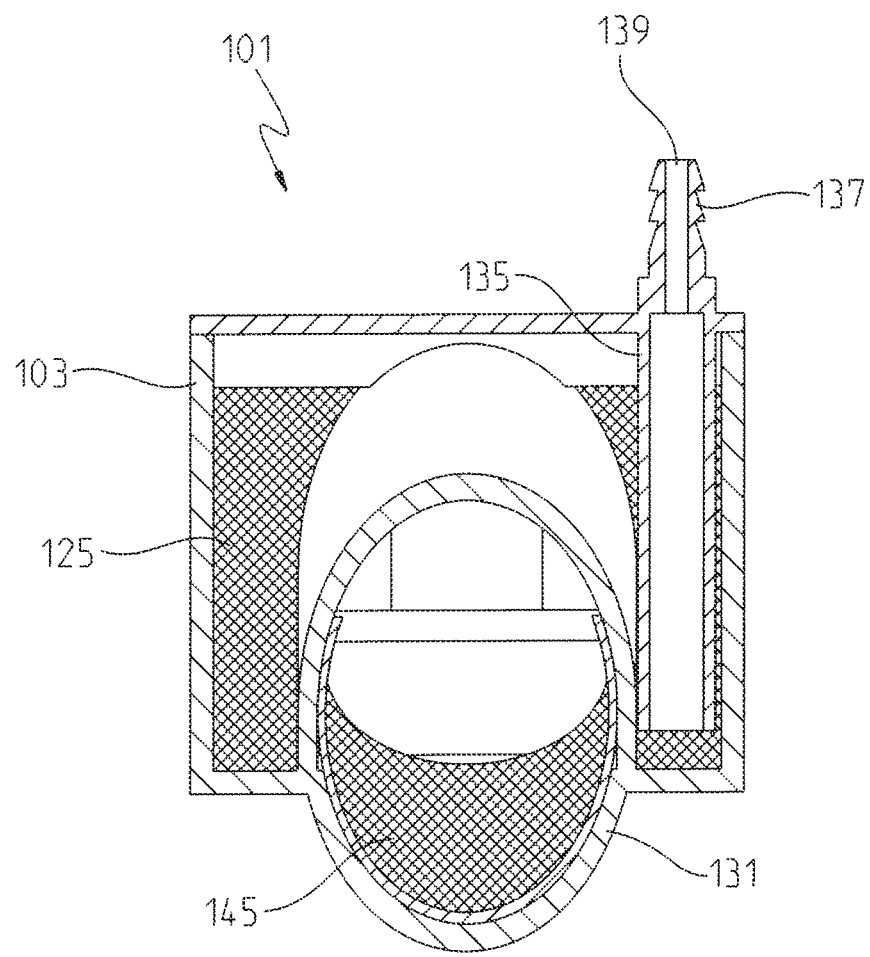
FIG. 5 is a view of the exemplary reservoir of FIG. 2 along line 5 in FIG. 2.

Turning now to FIGS. 1-5, an exemplary reservoir unit of the present disclosure is shown. FIG. 1A is a side perspective view of an exemplary reservoir of an exemplary air handing system of the present disclosure. FIG. 1B is an exploded view of the exemplary reservoir of FIG. 1A. FIG. 2 is a rear perspective view of the exemplary reservoir of FIG. 1A. FIG. 3 is a rear perspective view of the exemplary reservoir of FIG. 2, showing the sediment trap 143 removed from the reservoir. FIG. 4 is a view of the exemplary reservoir of FIG. 2 along line 4. FIG. 5 is a view of the exemplary reservoir of FIG. 2 along line 5.

Referring to FIG. 1A, an exemplary embodiment of reservoir 101 is shown. Reservoir 101 includes a basin 103 and a top structure 105. Basin 103 includes a first chamber 111 for holding a condensate, an inlet port 107 for receiving the condensate into the basin 103, and an outlet port 137 through which the condensate may exit the basin 103. As illustrated, a single inlet port 107 and a single outlet port 137 are provided. In one embodiment, multiple inlet ports and/or outlet ports are provided.

The basin 103 may be a single piece, or may be one or more parts that are fastened or fused together. In one embodiment, the basin 103 is substantially optically transparent, so that the level of condensate and/or the overall operation of the reservoir 101 may be monitored without disassembling the reservoir 101. The basin 103 comprises an inlet port 107, an outlet port 137, and a trap structure 131. In another embodiment, the inlet port 107, the outlet port 137, and the trap structure 131 may be attached to the basin 103. The basin 103 may also include one or more retainers that releasably engage with or otherwise cooperate with one or more retainers located on the top structure 105. Exemplary retainers include clips, fasteners, snap features, and other suitable devices to hold or constrain the relative position of two components in at least one degree of freedom. The basin 103 may also have a lip or groove that may engage with a similar lip or groove on the top structure 105, in order to form a seal so that condensate or other material may not escape from the interface between the basin 103 and the top structure 105, when the basin 103 and the top structure 105 are engaged.

The inlet port 107 and the outlet port 137 may be the same material as the basin 103. The inlet port 107 may be a part of the basin 103 or assembled thereto. In another embodiment, the inlet port 107 and the outlet port 137 may be a different material from the basin 103, or may be attached to the basin 103. The inlet port 107 surrounds a void 109 in the basin 103 in communication with the first chamber 111. The inlet port 107 releasably engages with a rigid or flexible connector to receive condensate from an air handling system. For example, and without limitation, the inlet port 107 may connect to a flexible tube, so that condensate and/or particulate matter flows through the flexible tube, through the inlet port 107, through the inlet port void 109, and into the first chamber 111 of the reservoir 101.

In the illustrated embodiment, the trap structure 131 is substantially cylindrical and is the same material as the basin 103. In one embodiment, the trap structure 131 is substantially optically transparent. In the exemplary embodiment, the longitudinal axis of the trap structure 131 is at a forty-five degree angle with respect to the base of the basin 103, and the longitudinal axis of the trap structure 131 intersects the edge of the basin 103 formed by the base and the rear wall. In other embodiments, the longitudinal axis of the trap structure 131 may be at a different angle with respect to the base of the basin 103. For example, and without limitation, the angle may be in a range from zero degrees to ninety degrees, and the trap structure 131 may intersect the basin 103 at any other position.

The trap structure 131 may be open on both ends, and the end of the trap structure 131 extending outside of the basin 103 may contain one or more trap structure threads 151. The one or more trap structure threads 151 may engage with one or more cap threads 149 located on the inner surface of a cap 147 of the sediment trap 143, and may reversibly engage with the one or more cap threads 149 to seal the sediment trap 143 against the trap structure 131. The seal of the sediment trap 143 and the trap structure 131 does not allow condensate to escape from the trap structure 131 to an outside of reservoir 101. The end of the trap structure 131 that extends into the basin 103 may form a section of a partition between the first chamber and the second chamber, and the trap structure 131 may be attached to the basin 103 and to a divider screen 125 which is part of the partition. Condensate may flow from a first chamber 111 to a second chamber 129 through the divider screen 125, or condensate may flow from the first chamber 111 to the second chamber 129 through a screen 145 of the sediment trap 143 and through a trap structure outlet 161 (see FIG. 4).

As mentioned herein, the sediment trap 143 includes a cap 147 and a screen 145. The cap 147 includes one or more cap threads 149 deposited along the inner wall. The cap 147 and the screen 145 may be the same material and may be a single piece. The cap threads 149 may releasably engage with the trap structure threads 151. The cap threads 149 and the trap structure threads 151 may allow the sediment trap 143 to turn one or more complete revolutions to fully engage with the trap structure 131, or the cap threads 149 and the trap structure threads 151 may allow the sediment trap 143 to, for example and without limitation, fully engage with the trap structure 131 after turning the sediment trap 143 one quarter of a revolution. Additional or alternative structures may be present along with the cap threads 149 and the trap structure threads 151 to releasably engage the sediment trap 143 to the trap structure 131.

The screen 145 allows condensate to pass from the first chamber 111, through the screen 145 and the trap structure outlet 161, and into the second chamber 129, but may stop debris and other particulate matter from passing from the first chamber 111 to the second chamber 129. The screen 145 may be a rigid or flexible material containing a plurality of openings through the screen 145. The openings may be of any size, shape, and number to selectively allow material to pass from the first chamber 111 to the second chamber 129. The openings may be sized to allow condensate and material of a certain size to pass from the first chamber 111 to the second chamber 129, or may be sized to allow condensate, while excluding substantially all other matter from passing from the first chamber 111 to the second chamber 129. The screen 145 is substantially cylindrical and may extend into the trap structure 131 when the sediment trap 143 is engaged with the trap structure 131. The screen 145 may rest against the inner surface of the trap structure 131, so that condensate flowing into the trap structure 131 flows through the screen 145 and the trap structure outlet 161 to enter the second chamber. The screen 145 is offset from the cap threads 149, so that the trap structure threads 151 may engage with the cap threads 149.

The top structure 105 may be the same material as the basin 103, or may be a different material. For example, and without limitation, the basin 103 is substantially optically transparent. The top structure 105 includes an outlet port, an outlet tube 135, and the float support 117. The outlet port, the outlet tube 135, and the float support 117 are integrated into the top structure 105. In another embodiment, the outlet port, the outlet tube 135, and the float support 117 may be separate from the top structure 105, and attached to the top structure 105.

The outlet tube 135 is substantially cylindrical and is hollow. The outlet tube 135 extends from the top structure so that when the top structure is engaged with the basin 103, the outlet tube 135 extends into the basin 103. In one embodiment, the outlet tube 135 extends near to the base of the basin 103, but the outlet tube 135 may extend to any position within the basin 103 when the top structure is engaged with the basin 103.

The outlet port 137 surrounds a void (not shown) in the top structure, such that the outlet port void is in communication with the hollow cylindrical outlet tube 135 and extends into the second chamber. The outlet port 137 releasably engages with a rigid or flexible connector to allow condensate to flow from the second chamber 129 to the condensate pump 160. For example, and without limitation, the outlet port 137 may connect to a flexible tube, so that condensate and/or particulate matter flows from the second chamber 129 of the reservoir 101, through the outlet tube 135, through the outlet port, through the flexible tube, and to the condensate pump 160.

The float support 117 extends through the basin 103. When the top structure 105 is releasably engaged with the basin 103, the float support 117 extends into the basin 103, and the float 113 surrounds the float support 117 so that the movement of the float 113 is substantially constrained except for movement towards the top structure 105 and away from the top structure 105. The float support 117 also includes a void 118 extending from the upper surface of the top structure 105, through the top structure 105 and into the float support 117. One or more sensors are be attached to one or more of the walls of the void 118, which interact with the magnet or magnets 115 attached to the float 113. Wires attached to the sensors 119, 121, and 123 may extend from void 118 and may be connected to the controller 171

The float 113 may be a closed cell foam material, for example Styrofoam, or may be an enclosed plastic material. The float 113 substantially surrounds or completely surrounds the float support 117, so that the float 113 travels along the float support 117. The float 113 may be a material or may be oriented in a way so that it is less dense than the condensate liquid, allowing the float 113 to rise and fall along the float support 117 axis in response to the level of condensate liquid in the first chamber 111. If no condensate liquid is in the first chamber 111, for example, the float 113 may rest on the lower inner surface of the basin 103. If the first chamber 111 is full of condensate liquid, the float 113 may rest at or near the upper inner surface of the basin 103. The float 113 additionally has one or more magnets 115 (see FIG. 4) deposited on the surface of the float 113 or embedded within the float 113. The magnets 115 interact with one or more sensors in the float support 117 to indicate the amount of condensate liquid in the first chamber 111. In one embodiment, the float 113 may be symmetrical, and the magnet or magnets 115 may be centered vertically on the float 113, so that the float 113 could be installed around the float support 117 in either orientation and the magnet or magnets 115 would interact with the one or more sensors 119, 121, and 123 in the float support 117.

The divider screen 125, along with the trap structure 131 and the trap structure outlet 161, divides the basin 103 into a first chamber 111 and a second chamber 129, and allows condensate to pass from the first chamber 111 to the second chamber 129, but may stop debris and other particulate matter from passing from the first chamber 111 to the second chamber 129. The divider screen 125 may be a rigid or flexible material containing a plurality of openings through the divider screen 125. The openings may be of any size, shape, and number to selectively allow material to pass from the first chamber 111 to the second chamber 129. The openings may be sized to allow condensate and material of a certain size to pass from the first chamber 111 to the second chamber 129, or may be sized to allow condensate, while excluding substantially all other matter from passing from the first chamber 111 to the second chamber 129. The divider screen 125 is permanently attached to the basin 103. In another embodiment, the divider screen 125 is reversibly engaged to the inner surface of the basin 103, and the divider screen 125 may be removed from the basin 103 for maintenance, replacement, and/or cleaning. In one embodiment, the divider screen 125 may include a fine mesh or may include small holes to allow condensate to seep from the first chamber 111 to the second chamber 129, bypassing the sediment trap 143. This may allow for a low flow rate of condensate from capillary action, if the screen 145 is clogged with debris. In one embodiment, the float and float support are positioned on an opposite side of the basin 103 such that the float and float support are in the second chamber.

Shown in FIG. 4, the high sensor 123, the medium sensor 121, and the low sensor 119 may be attached to the inner void 118 of the float support 117, and interact with the magnet or magnets attached to the float 113. For example, the sensors may be Hall-effect sensors, or may be reed switches. The magnetic field of the magnet or magnets 115 in the float 113 interacts with one or more of the sensors, depending on the position of the float 113 along the float support 117. For example, if the float 113 is at or near the base of the basin 103, the magnet or magnets 115 in the float 113 would interact with the low sensor 119, but would not interact with the medium sensor 121 or the high sensor 123. If the float 113 is in or near the middle of the basin 103, the magnet or magnets 115 in the float 113 would interact with the medium sensor 121, but would not interact with the low sensor 119 or the high sensor 123. If the float 113 is at or near the top structure 105 of the basin 103, adjacent to the top structure 105, the magnet or magnets 115 in the float 113 would interact with the high sensor 123, but would not interact with the low sensor 119 or the medium sensor 121. In other embodiments, the position of the float 113 may activate multiple sensors, based on the spacing of the sensors. For example, if the float 113 was between the low sensor 119 and the medium sensor 121, both the low sensor 119 and the medium sensor 121 may be activated. This may provide increased resolution on the relative position of the float 113. In other embodiments, more or fewer sensors may be used to detect the position of the float 113. While the exemplary reservoir includes magnetic sensors, such as Hall-effect sensors or reed switches, other sensors may be used to detect the float 113 position within the basin 103. For example, and without limitation, optical sensors may be used to measure condensate volume, or sensors to measure the weight of the condensate may be used. Sensors may also be used in a way that a float 113 may be optional.

Figure 9A:
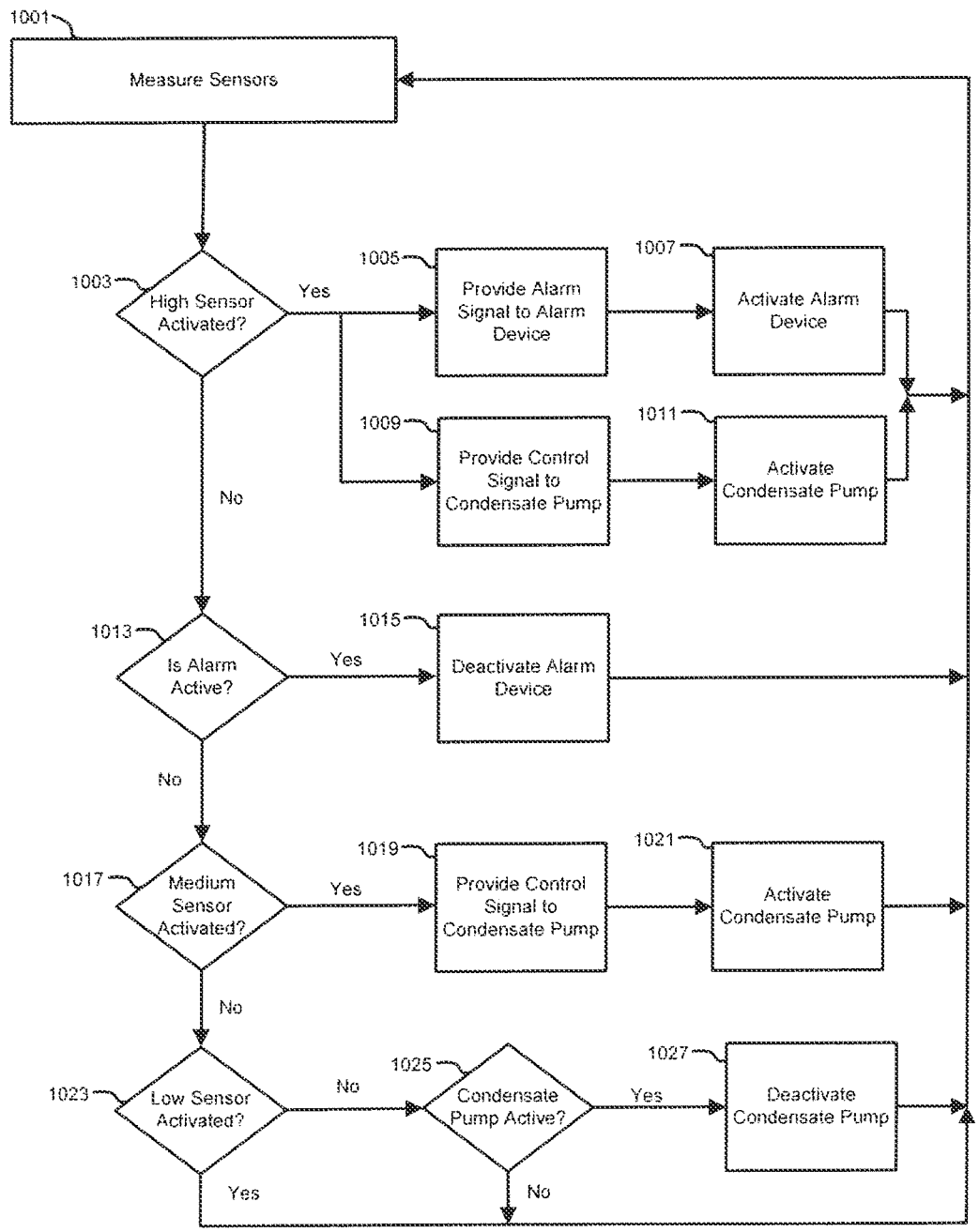
FIG. 9A is a processing sequence depicting an operation of the reservoir according to an embodiment of the present disclosure.

Turning now to FIG. 9A, a flow chart depicting an operation of the reservoir 101 is shown. As represented in block 1001, the controller 171 measures the sensors. The controller 171 requests data from the sensors, or monitors the sensor inputs to determine if a sensor is activated.

As represented in block 1003, if the high sensor 123 is activated, the float 113 is positioned at or near the top structure 105 of the basin 103, adjacent to the top structure 105, or at the top structure 105 of the float support 117. The controller 171 may interpret a signal from the high sensor 123 as an indication that the condensate pump 160 has failed, or that condensate is flowing into the second chamber 129 faster than the condensate pump's ability to remove condensate. As represented in block 1005, the controller 171 provides an alarm signal to an alarm device. The alarm device may activate, as represented in block 1007. The alarm device may be associated with the controller 171, and the alarm device takes one or more actions to provide an alert or to reduce possible damage to the system. For example, the alarm device may shut off the air conditioning system, so that the fan and heat exchanger does not produce additional condensate. The alarm device may activate one or more warning indicators, for example a light or warning message, on a panel to indicate to a user that the system may be in a fault state. Or the alarm device may send a message to another system, such as over a telephone line, a cellular connection, or a computer network, to communicate the alert.

The controller 171 also provides a control signal to the condensate pump 160, as represented in block 1009. As represented in block 1009, the controller 171 provides a control signal to the condensate pump 160, and as represented in block 1011, the condensate pump 160 activates in response to the control signal from the controller 171, and removes condensate from the second chamber 129. In one embodiment, controller 171 simply provides or cuts power to the condensate pump 160. The controller 171 continues to measure the sensors, as represented in block 1001. If the high sensor 123 is not activated, the controller may proceed to other tasks, as represented in block 1013.

As represented in block 1013, the controller 171 determines if an alarm signal has been provided to the alarm device. If an alarm signal has been provided to the alarm device, and the high sensor 123 is not activated, the controller 171 terminates the alarm event, and stops the alarm signal or sends a separate signal to indicate the termination of the alarm signal, as represented in block 1015. If the alarm is not active, the controller 171 may proceed to other tasks, as represented in block 1017.

As represented in block 1017, if the medium sensor 121 is activated, the float 113 is positioned at or near the middle of the basin 103, or the midpoint of the float support 117. The controller 171 interprets a signal from the medium sensor 121 as an indication that enough condensate is in the second chamber 129 to activate the pump and begin to remove condensate from the second chamber 129. As represented in block 1019, the controller 171 provides a control signal to the condensate pump 160, and as represented in block 1021, the condensate pump 160 activates in response to the control signal from the controller 171, and removes condensate from the second chamber 129. In one embodiment, controller 171 simply provides or cuts power to the condensate pump 160. The controller 171 continues to measure the sensors, as represented in block 1001. If the medium sensor is not activated, the controller may proceed to other tasks, as represented in block 1023.

As represented in block 1023, if the low sensor 119 is activated, the float 113 is at or near the base of the basin 103. The position of the float 113 when the low sensor 119 is activated may indicate that there is little or no condensate in the second chamber 129. The controller 171 determines if the condensate pump 160 is active, as represented in block 1025. If the controller 171 has previously provided a control signal to the condensate pump 160, to activate the condensate pump 160, then the controller 171 deactivates the signal to the condensate pump 160, as represented in block 1027. The controller 171 measures the sensors, as represented in block 1001. If the condensate pump 160 was not active, the controller 171 measures the sensors, as represented in block 1001.

In one embodiment, a single-pole, double throw relay may be utilized in the controller 171, including three wires, corresponding to features of "Common," "Normally Closed," and "Normally Open." The "Common" and "Normally Closed" wires could be connected in series with control wires associated with a thermostat so that if a fault condition occurs, the connection normally running through the control wires may be broken and the compressor may shut down, stopping further condensate creation. The "Common" and "Normally Open" connections may be connected to an alarm or monitoring service to alert a user of a fault condition.

In one embodiment of the design a feature may be added to provide additional feedback to the user whereby a separate wire for "Fault" is incorporated. The control circuitry could switch a voltage to this line on a fault condition such as 'Overflow' or 'Alarm'. This could be configured to switch a low voltage AC signal or a low voltage DC signal or switch mains voltage to the line.

Figure 9B:
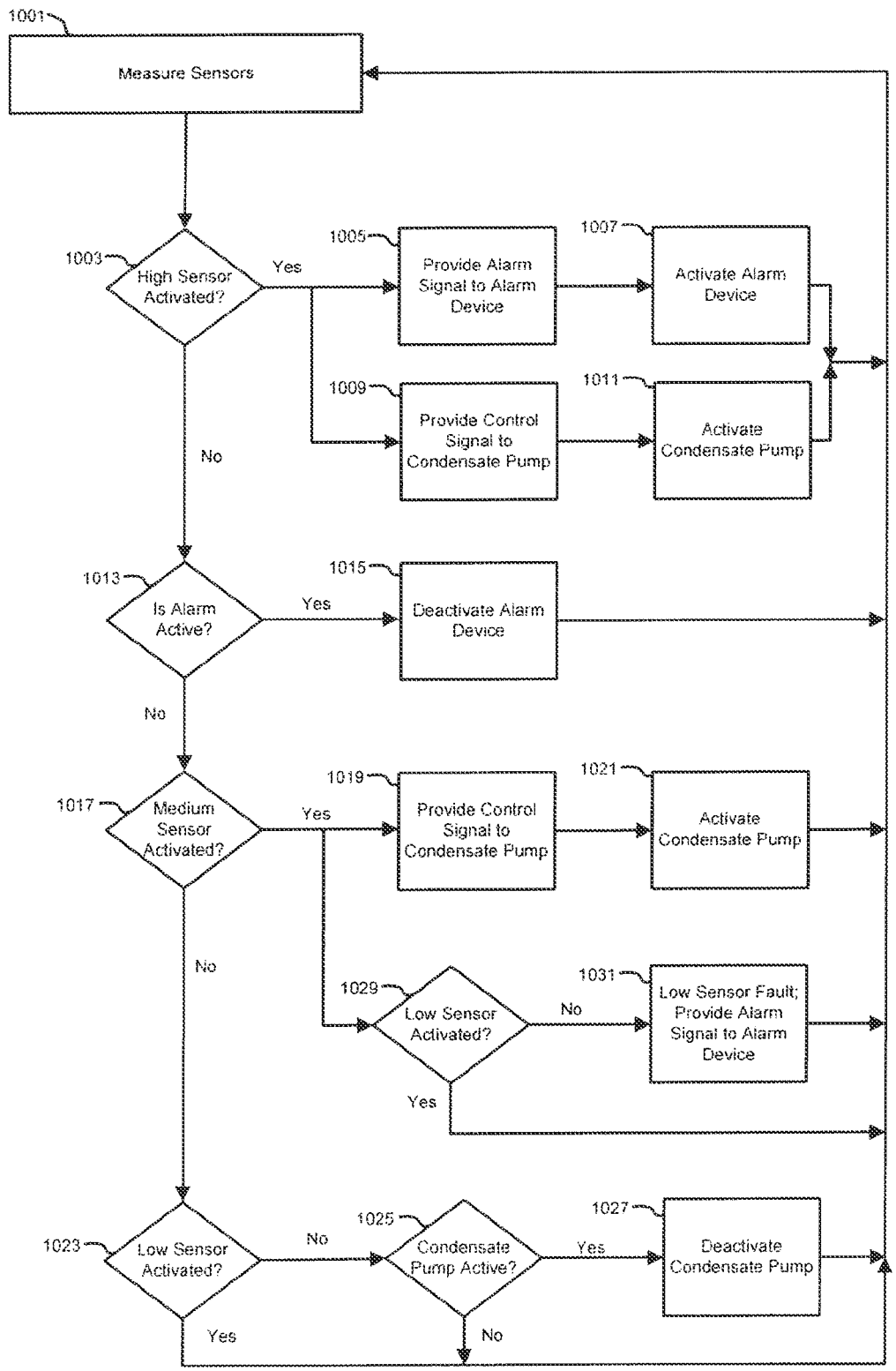
FIG. 9B is a processing sequence depicting an operation of the reservoir with low sensor failure detection according to an embodiment of the present disclosure.

Turning now to FIG. 9B, a processing sequence depicting an operation of the reservoir with low sensor failure detection according to an embodiment of the present disclosure is shown. FIG. 9A and FIG. 9B are similar, except that when the controller 171 determines that the medium sensor 121 is activated, as represented in block 1017, the controller 171 may also determine if the low sensor 119 is activated, as represented in block 1029. If the low sensor 119 is activated, the controller 171 may continue to measure the sensors, as represented in block 1001. If the low sensor 119 is not activated, the controller 171 may determine that the low sensor 119 is in a fault condition, and may provide an alarm signal to an alarm device, as represented in block 1031. The alarm device may operate to inform a user of the fault condition.

Figure 9C:
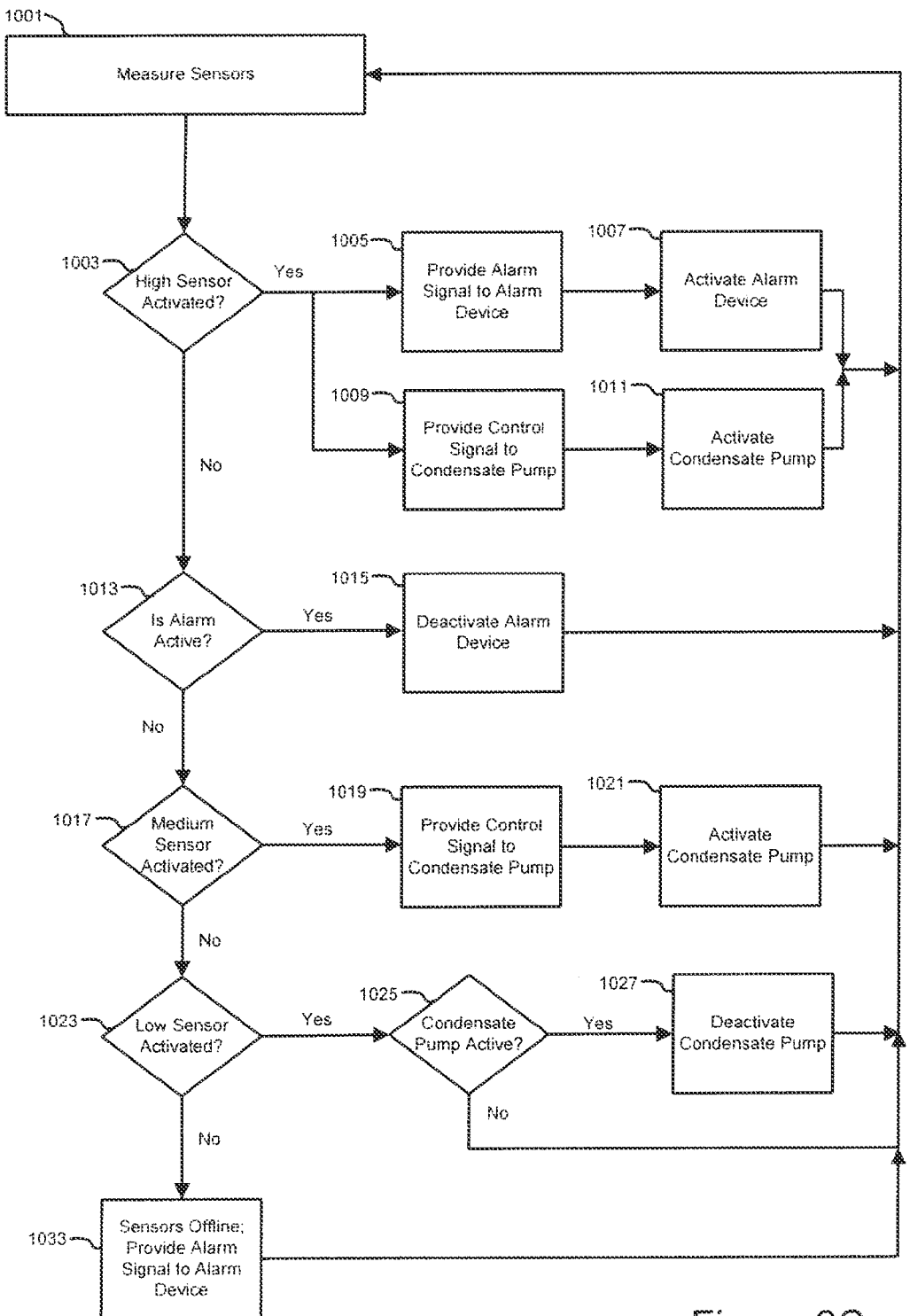
FIG. 9C is a processing sequence depicting an operation of the reservoir with sensor failure detection according to an embodiment of the present disclosure.

Turning now to FIG. 9C, a processing sequence depicting an operation of the reservoir with sensor failure detection according to an embodiment of the present disclosure is shown. FIG. 9A and FIG. 9C are similar, except that, as represented in block 1033, if the controller 171 does not receive a signal from the low sensor 119, the medium sensor 121, or the high sensor 123, the controller 171 may determine that the sensors are offline. For example, the wiring to the sensors may be damaged, or one or more of the sensors may be damaged. The controller 171 provides an alarm signal to an alarm device to indicate the sensors are offline. The alarm device may activate one or more warning indicators, for example a light or warning message, on a panel to indicate to a user that the system may be in a fault state. Or the alarm device may send a message to another system, such as over a telephone line, a cellular connection, or a computer network, or any other network, to communicate the alert. The controller 171 continues to measure the sensors, as represented in block 1001. If, subsequent to providing an alarm signal, the controller 171 receives a signal from the low sensor 119, the medium sensor 121, or the high sensor 123, the controller 171 may stop the alarm signal or send a separate signal to indicate the termination of the alarm signal.

Figure 9D:
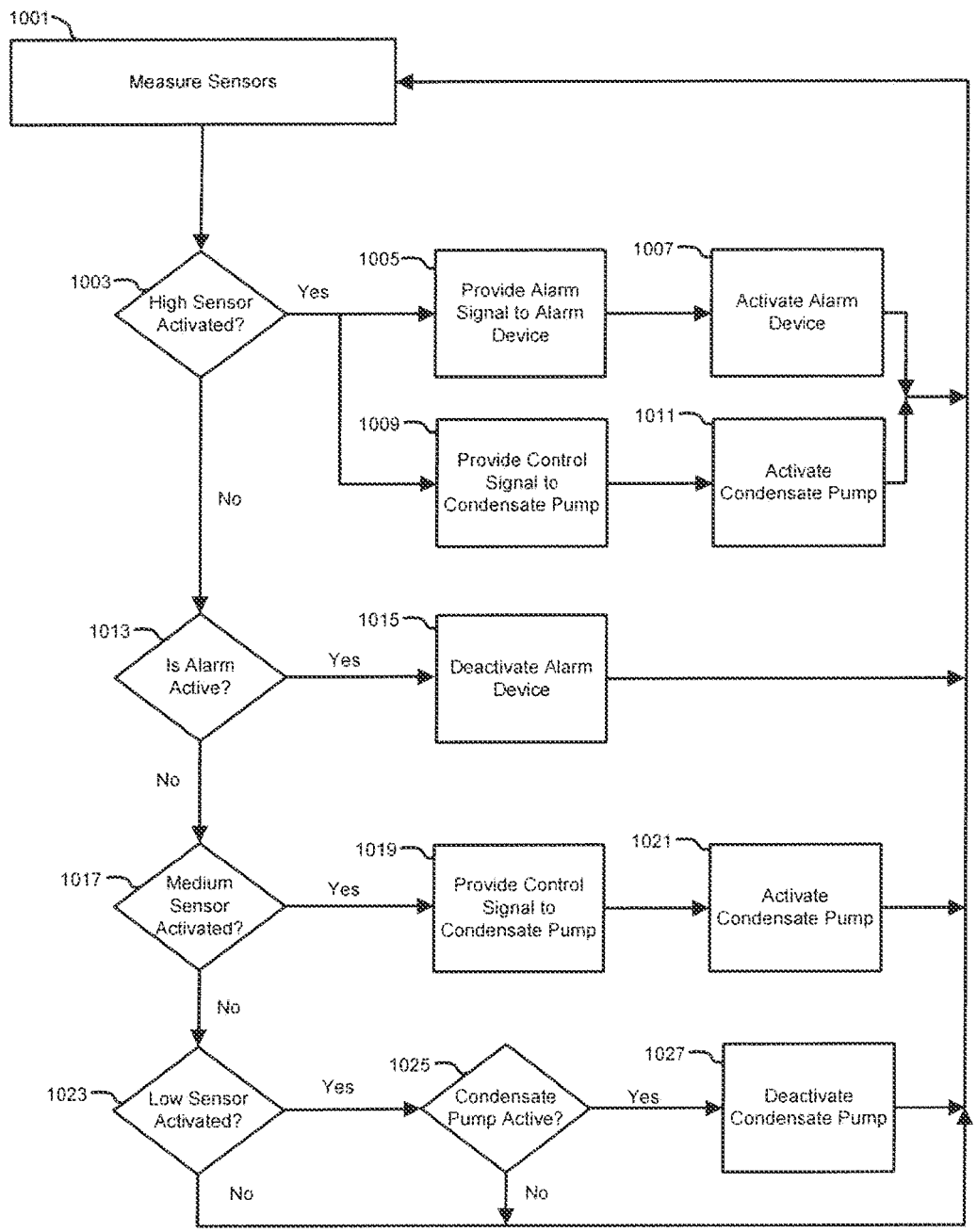
FIG. 9D is a processing sequence depicting an operation of the reservoir according to FIG. 9C without sensor failure detection according to an embodiment of the present disclosure.

Turning now to FIG. 9D, a processing sequence depicting an operation of the reservoir according to FIG. 9C without sensor failure detection according to an embodiment of the present disclosure is shown. FIG. 9C and FIG. 9D are similar, but the fault detection as represented in block 1033 of FIG. 9C is not present. The sensor fault detection as represented in block 1033 if FIG. 9C may be optional in embodiments.

Figure 10:
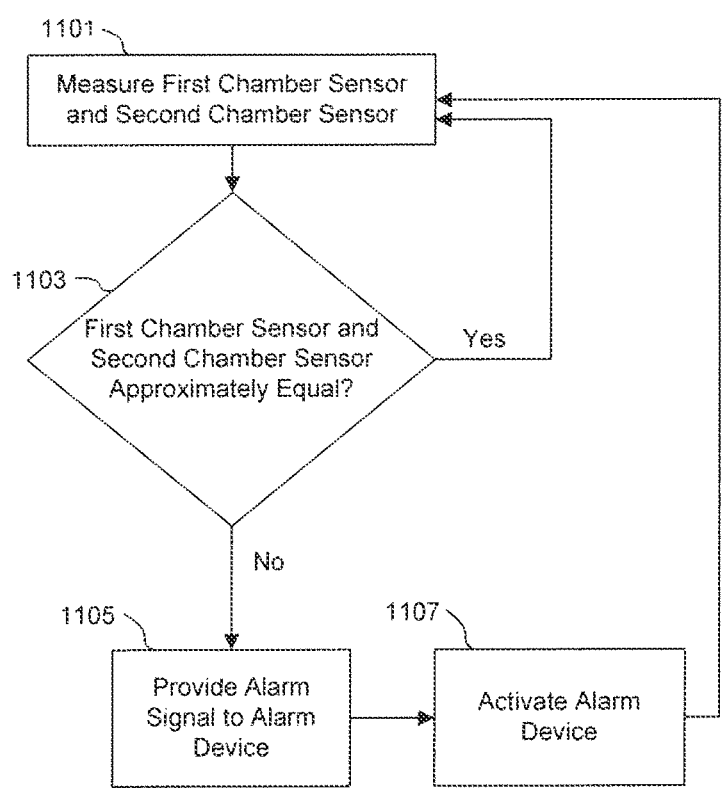
FIG. 10 is a processing sequence of a controller of the system of FIG. 7 according to an embodiment of the present disclosure.

Turning now to FIG. 10, a flow chart depicting a condensate level determination for an exemplary reservoir of the present disclosure is shown. In one embodiment, a first chamber sensor (not shown) is located in the first chamber 111, and a second chamber sensor (not shown) is located in the second chamber 129. The first chamber sensor and the second chamber sensor measure the levels of condensate in the first chamber 111 and the second chamber 129, respectively. The first chamber sensor and the second chamber sensor may be, for example and without limitation, a series of optical sensors extending through the basin 103 to measure the condensate levels, or may be another type of sensor used to measure condensate levels. As represented in block 1101, the controller 171 measures the first chamber sensor and the second chamber sensor. The controller 171 may send the request to the first chamber sensor and the second chamber sensor, or the first chamber sensor and the second chamber sensor may send the information to the controller 171 continuously or at an interval, or a combination of reporting may be used. The controller 171 may interpret the signals received from the first chamber sensor and the second chamber sensor as levels of condensate in the first chamber 111 and in the second chamber 129, respectively, as represented in block 1103. If the condensate levels in the first chamber 111 and the second chamber 129 are approximately equal, the controller 171 may continue to measure the first chamber sensor and the second chamber sensor, as represented in block 1101.

If the condensate levels in the first chamber 111 and the second chamber 129 are not approximately equal, a fault condition may exist. For example, and without limitation, the screen 125 between the first chamber 111 and the second chamber 129, and screen 145 of sediment trap 143, may be clogged with debris, so that condensate cannot move, or may slowly move from the first chamber 111 to the second chamber 129. The controller 171 provides an alarm signal to an alarm device, as represented in block 1105. The alarm device may be associated with the controller 171, and may take one or more actions, as represented in block 1107, to provide an alert or to reduce possible damage to the system. For example, the alarm device may shut off the air conditioning system, so that the fan and heat exchanger do not produce additional condensate. The alarm device may activate one or more warning indicators, for example a light or warning message, on a panel to indicate to a user that the system may be in a fault state. Or the alarm device may send a message to another system, such as over a telephone line, a cellular connection, or a computer network, to communicate the alert. The controller 171 continues to monitor the first chamber sensor and the second chamber sensor, as represented in block 1101. In one embodiment, the user may take an action to stop the fault condition. For example, and without limitation, the user may depress a button to reset the controller 171 and stop the alarm signal. In an embodiment, the controller 171 measures the first chamber sensor and the second chamber sensor, and if the controller 171 had previously determined that the first chamber sensor and the second chamber sensor did not have approximately equal condensate levels, and the levels are now approximately equal, the controller 171 stops the alarm signal. In another embodiment, the controller 171 measures the first chamber sensor and the second chamber sensor one or more times over a period of time, and may not provide an alarm signal until the condensate levels in the first chamber 111 and the second chamber 129 are not approximately equal for a period of time.

Figure 6:
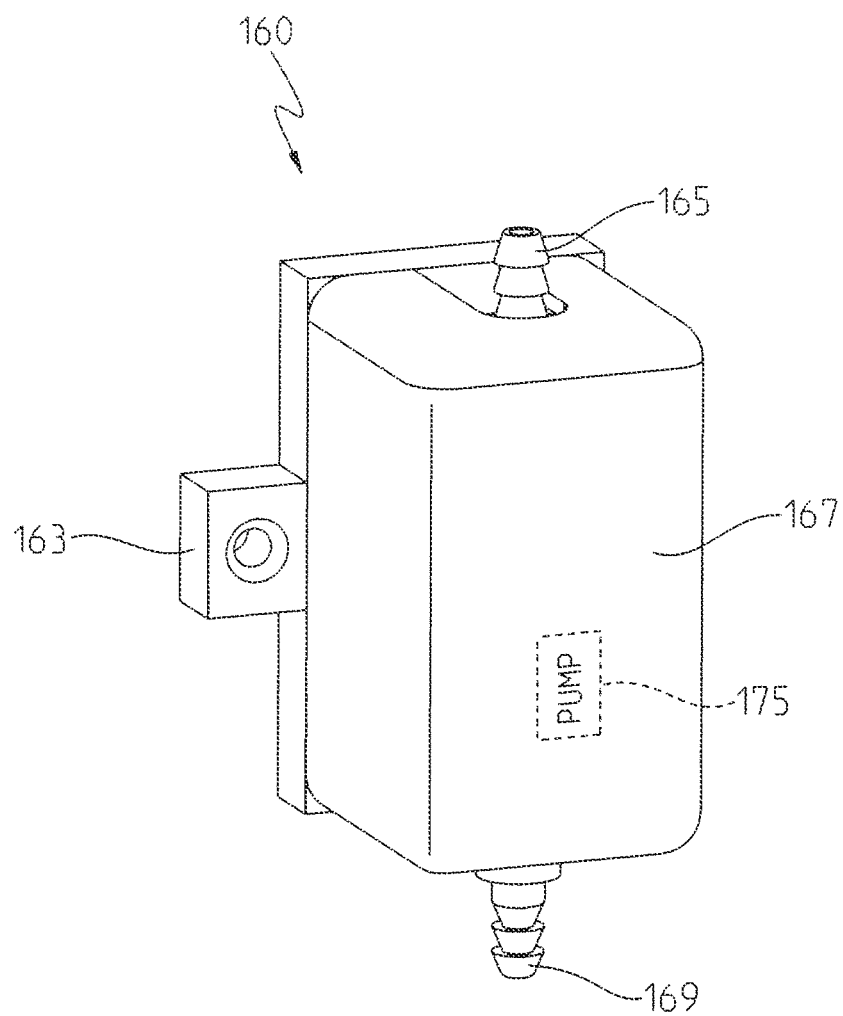
FIG. 6 is a front perspective view of an exemplary condensate pump according to an embodiment of the present disclosure.

Turning now to FIG. 6, FIG. 6 is a front perspective view of an exemplary condensate pump 160 according to an embodiment of the present disclosure. The condensate pump 160 apparatus includes a pump 175, an inlet port 169, an outlet port 165, and a structure 167. The structure 167 includes a pump bracket 163. The structure 167, inlet port 169, outlet port 165, and pump bracket 163 may be the same material in a one-piece construction, or one or more of the elements may be separate and attached together.

The pump 175 creates a lower pressure in the inlet port 169, pulling condensate from the second chamber 129 of the reservoir 101 and through the flexible tube connecting the reservoir 101 to the condensate pump 160. The pump 175 pushes condensate through and out of the outlet port 165. The pump 175 may be similar to the pump described in U.S. Patent Publication No. 2009/0129939, application Ser. No. 11/985,503, entitled "Apparatus for Thermal Dissipation and Retention of Float 113," and filed Nov. 15, 2007, the disclosure of which is herein incorporated by reference in its entirety. The condensate pump 160 may, for example, include the ability to recirculate condensate past the pump to help cool the pump.

Figure 7:
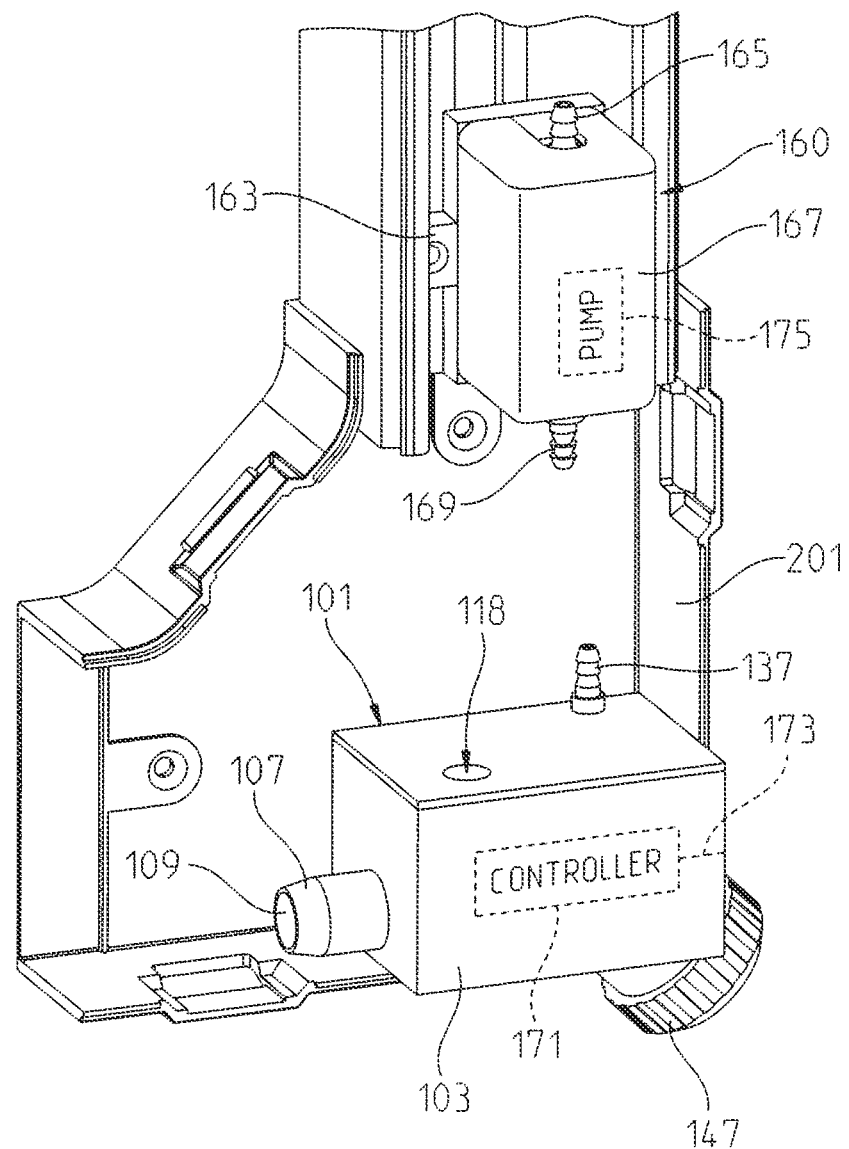
FIG. 7 is a side view of the exemplary reservoir of FIG. 2 and the exemplary condensate pump of FIG. 6 in an exemplary mounting bracket.

Turning now to FIG. 7, FIG. 7 is a side perspective view of an exemplary reservoir of FIG. 2A and an exemplary condensate pump of FIG. 6 in a ninety degree orientation with a retainer. The position of the reservoir 101 and the condensate pump 160 may be releasably locked by the use of a mounting bracket 201. The mounting bracket 201 connects to one or more brackets on the reservoir 101 and the pump bracket 163 on the condensate pump 160. For example, the mounting bracket 201 may releasably interact with one or more grooves on the reservoir 101 and the pump bracket 163 on the condensate pump 160. The mounting bracket 201 is a rigid material. The exemplary mounting bracket 201 interacts with the reservoir 101 and the condensate pump 160 to position the reservoir 101 and the condensate pump 160 at a ninety degree angle. A mounting bracket 201 that positions the reservoir 101 and the condensate pump 160 at other angles may also be used, and a mounting bracket 201 that positions the reservoir 101 and the condensate pump 160 closer or farther apart may also be used. In one embodiment, the mounting bracket 201 may be integral to the cover, so that the reservoir 101 and the condensate pump 160 may be positioned and releasably held to the cover. The bracket may be located on the cover to position the reservoir 101 and the condensate pump 160 in any orientation and in any distance from one another.

The controller 171 may be associated with the reservoir 101, and may be located on or within the reservoir 101. In one embodiment, the controller 171 is a microprocessor with associated memory. In another embodiment, the controller 171 is another type of analog or digital processor. In other embodiments, the controller 171 may be located on, within, or associated with the condensate pump 160. The controller 171 receives information from one or more sensors that are in communication with the controller 171 via a controller interface 173. For example, the controller 171 is in communication with the high sensor 123, the medium sensor 121, and the low sensor 119 via the controller interface 173. The high sensor 123, the medium sensor 121, and the low sensor 119 transmit information to the controller 171 regarding the position of the float 113, and the controller 171 activates the condensate pump 160 based on the information received. The controller 171 may also be in communication with the first chamber sensor and the second chamber sensor, and may receive information from the first chamber sensor and the second chamber sensor regarding the condensate levels in the first chamber 111 and the second chamber 129, respectively. In an embodiment, the controller 171 communicates with sensors and/or a thermostat or other control components via a wireless link. For example, and without limitation, the controller 171 communicates using a wireless computer network protocol or a proprietary protocol over a radio link. In one embodiment, a detachable wiring harness is used that does not require additional tools to attach. The detachable wiring harness may provide electricity to the condensate pump 160 and/or the controller 171. If the condensate pump 160 was later replaced, the wiring harness could be unplugged from the condensate pump 160 and/or the controller 171, and reinstalled into a new condensate pump. The wiring of the wiring harness could be keyed so that the wiring could not be installed incorrectly.

The reservoir 101 and the condensate pump 160 may be mounted in, for example and without limitation, ductwork, such as shown in FIG. 7. A mounting bracket 201 with an integrated elastomer may be provided to mount the condensate pump 160 and the reservoir 101 to a wall. The elastomer may allow the reservoir 101 and the condensate pump 160 to be isolated from other components of the air handling system, and may serve to dampen vibrational energy from the reservoir 101 and/or the condensate pump 160, and other components of the air handling system. The mounting bracket 201 may also include a cover, to cover the mounting bracket, the reservoir 101, and the condensate pump 160, and other components of the air handling system that may be attached to the mounting bracket 201. For example, the coolant may flow from the heat exchanger and fan to the heat exchanger and pump in one or more flexible tubes through the mounting bracket and cover. The cover may be releasably attached to the mounting bracket 201 so that the cover may be removed without additional tools, and the reservoir 101, the condensate pump 160, or other components may be reached and/or serviced. The mounting bracket 201 and cover may have an opening so that the sediment trap 143 may be removed without removing the cover and/or the mounting bracket 201. A structure, for example and without limitation an elastomeric foam gasket or a sliding structure, may also be provided to cover a gap between the ductwork and the portion of the air handling system to which the ductwork is connected.

The condensate pump 160 may attach to the mounting bracket 201 without the use of additional tools. For example, the mounting bracket 201 may include one or more projections, and/or the condensate pump 160 may include one or more projections. The projections of the mounting bracket 201 and/or the condensate pump 160 may reversibly engage to attach the mounting bracket 201 to the condensate pump 160. In one embodiment, a part of the mounting bracket may slide into a corresponding slot on the condensate pump 160, or vice versa.

The reservoir 101 may also attach to the mounting bracket 201 without the use of additional tools. The reservoir 101 may also include one or more projections, and/or the mounting bracket 201 may include one or more projections to releasably attach the reservoir 101 to the mounting bracket 201. In one embodiment, a part of the mounting bracket may slide into a corresponding slot on the reservoir 101, or vice versa.

One or more of the components may be similar to the components or methods described in CONDENSATE REMOVAL SYSTEM AND METHOD, U.S. Provisional Patent Application 61/324,541, filed Apr. 15, 2010, the disclosure of which is expressly incorporated by reference herein.

While this disclosure has been described as having exemplary designs, the present disclosure can be further modified within the spirit and scope of this disclosure. This application is therefore intended to cover any variations, uses or adaptations of the disclosure using its general principles. Further, this application is intended to cover such departures from the present disclosure as come within known or customary practice in the art to which this disclosure pertains and which fall within the limits of the appended claims.

We claim:

1. An apparatus for handling a condensate fluid, the apparatus comprising:
a reservoir having a basin which receives the condensate fluid and at least a first port through which the condensate fluid is evacuated;
a sediment trap including a screen, the sediment trap being removably coupled to the reservoir, the screen extending into the basin when the sediment trap is coupled to the reservoir;
a pump housing including a fluid pump;
a fluid conduit in fluid communication with the condensate fluid in the reservoir through the first port of the reservoir and in fluid communication with the fluid pump;
at least one sensor which provides an indication of a height of the condensate fluid in the reservoir; and
a controller which activates the fluid pump based on the height of the condensate fluid in the reservoir.

2. The apparatus of claim 1, further comprising a float including at least one magnet, the reservoir including a float support which carries the at least one sensor, the at least one sensor providing an indication of a position of the float in the reservoir.

3. The apparatus of claim 1, wherein the reservoir includes a trap structure which receives the screen of the sediment trap.

4. The apparatus of claim 3, further comprising a divider screen positioned within the reservoir, the divider screen and the screen of the trap structure dividing the reservoir into a first chamber and a second chamber, wherein the condensate fluid passes through one of the divider screen and the reservoir screen to flow from the first chamber to the second chamber.

5. The apparatus of claim 4, wherein the fluid is introduced into the reservoir in the first chamber and the first port is positioned in the second chamber.

6. The apparatus of claim 5, further comprising a float including at least one magnet, the reservoir including a float support which carries the at least one sensor, the at least one sensor providing an indication of a position of the float in the reservoir.

7. An air handling system positioned within a structure, the air handling system comprising:
a fan and heat exchanger unit;
a reservoir including a basin positioned to receive a condensate fluid from the fan and heat exchanger unit;
a sediment trap being removably coupled to the reservoir, the sediment trap capturing debris within the condensate fluid;
a fluid pump in fluid communication with the reservoir to remove the condensate fluid from the reservoir;
a fluid conduit for communicating the fluid removed from the reservoir towards a location outside of the structure; and
a float including at least one magnet, the reservoir including a float support which carries the at least one sensor, the at least one sensor providing an indication of a position of the float in the reservoir.

8. The air handling system of claim 7, further comprising ductwork to at least partially conceal the reservoir and the fluid pump.

9. The air handling system of claim 7, wherein the sediment trap includes a screen, the screen extending into the basin when the sediment trap is coupled to the reservoir.

10. An air handling system positioned within a structure, the air handling system comprising:
a fan and heat exchanger unit;
a reservoir including a basin positioned to receive a condensate fluid from the fan and heat exchanger unit;
a sediment trap being removably coupled to the reservoir, the sediment trap capturing debris within the condensate fluid;
a fluid pump in fluid communication with the reservoir to remove the condensate fluid from the reservoir;
a fluid conduit for communicating the fluid removed from the reservoir towards a location outside of the structure; and
a divider screen positioned within the reservoir, the divider screen and a screen of the trap structure dividing the reservoir into a first chamber and a second chamber, wherein the condensate fluid passes through one of the divider screen and the screen to flow from the first chamber to the second chamber, wherein the reservoir includes a trap structure which receives the screen of the sediment trap.

11. The air handling system of claim 10, wherein the condensate fluid is introduced into the reservoir in the first chamber and a first port is positioned in the second chamber.

12. The air handling system of claim 11, further comprising a float including at least one magnet, the reservoir including a float support which carries the at least one sensor, the at least one sensor providing an indication of a position of the float in the reservoir.

13. The air handling system of claim 10, further comprising ductwork to at least partially conceal the reservoir and the fluid pump.

14. The air handling system of claim 11, further comprising ductwork to at least partially conceal the reservoir and the fluid pump.

15. The air handling system of claim 11, wherein the condensate fluid passes through the first portion to the fluid pump.

16. The air handling system of claim 12, further comprising ductwork to at least partially conceal the reservoir and the fluid pump.

\* \* \* \* \*